(12) United States Patent  
Sato

(10) Patent No.: US 8,654,404 B2  
(45) Date of Patent: Feb. 18, 2014

(54) IMAGE PROCESSING APPARATUS, IMAGE PROCESSING METHOD AND MEMORY MEDIUM

(71) Applicant: Canon Kabushiki Kaisha, Tokyo (JP)

(72) Inventor: Hirochika Sato, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/733,204

(22) Filed: Jan. 3, 2013

(65) Prior Publication Data

US 2013/0120786 A1 May 16, 2013

Related U.S. Application Data

(63) Continuation of application No. 13/398,955, filed on Feb. 17, 2012, now Pat. No. 8,368,966, which is a continuation of application No. 13/164,198, filed on Jun. 20, 2011, now Pat. No. 8,144,369, which is a continuation of application No. 12/046,575, filed on Mar. 12, 2008, now Pat. No. 7,986,443.

(30) Foreign Application Priority Data

Mar. 13, 2007 (JP) ................................ 2007-063216

(51) Int. Cl.  
*H04N 1/40* (2006.01)

(52) U.S. Cl.  
USPC ......................................... 358/3.28; 358/468

(58) Field of Classification Search  
USPC .......... 358/3.28, 1.9, 2.1, 468, 400, 500, 406, 358/504; 347/107  
See application file for complete search history.

(56) References Cited

U.S. PATENT DOCUMENTS

| 5,444,779 A | 8/1995 | Daniele |
| 6,970,259 B1 | 11/2005 | Lunt et al. |
| 7,110,541 B1 | 9/2006 | Lunt et al. |
| 7,986,443 B2 | 7/2011 | Sato |
| 8,144,369 B2 | 3/2012 | Sato |
| 2012/0147434 A1 | 6/2012 | Sato |

FOREIGN PATENT DOCUMENTS

| JP | 2000-013584 A | 1/2000 |
| JP | 2001-344588 A | 12/2001 |
| JP | 2005-252891 A | 9/2005 |
| JP | 2005-318201 A | 11/2005 |

OTHER PUBLICATIONS

Official Notice of Rejection dated Jun. 9, 2009 in corresponding JP 2007-063216.

*Primary Examiner* — Thomas D Lee  
*Assistant Examiner* — Stephen M Brinich  
(74) *Attorney, Agent, or Firm* — Rossi, Kimms & McDowell LLP

(57) ABSTRACT

An object of the present invention is to solve dissatisfaction of the user who can not take out the source data in a case where a code image in the original can not be decoded. In order to accomplish the above object, the invention provides an image processing apparatus comprising code image detection unit that determines whether or not an code image is included in the original image data, code image decoding unit that decodes the code image to extract source data if it is determined that the code image is included by the code image detection unit, and synthesizing unit that encodes information obtained by decoding a partial area of the code image and overlaying encoded information on the area where the code image is included, if the code image decoding unit is successful in decoding only the partial area of the code image.

42 Claims, 15 Drawing Sheets

IMAGE PROCESSING APPARATUS, IMAGE PROCESSING METHOD AND MEMORY MEDIUM

BACKGROUND OF THE INVENTION

1. Field of the Invention

The present invention relates to an image processing apparatus, an image processing method and a memory medium in which the code images can be treated.

2. Description of the Related Art

Conventionally, it is common that the code image is created by encoding source data and the created code image (e.g., bar code, two-dimensional code, electronic watermark) is printed on the output paper, as disclosed in Japanese Patent Laid-Open No. 2001-344588.

Further, the code image is scanned by a scanner to acquire source data, which is used to manage the document or merchandise, as disclosed in Japanese Patent Laid-Open No. 2000-013584.

SUMMARY OF THE INVENTION

It is easy to obtain the copied matter from an output paper where the code image is printed. Simply, the output paper may be put on an image forming apparatus. However, if any part of the code image is contaminated on the output paper, the copied matter is obtained in which the source data can not be taken out (extracted) from the code image.

Then, the person who receives the copied matter is dissatisfied at not taking out information from the copied matter.

The invention has been achieved to solve such dissatisfaction of the user (person who receives the copied matter).

In order to solve the above-mentioned problem, the present invention provides an image forming apparatus comprising code image detection unit that determines whether or not an code image is included in the original image data, code image decoding unit that decodes the code image to extract source data if it is determined that the code image is included by the code image detection unit, and synthesizing unit that encodes information obtained by decoding a partial area of the code image and overlaying it on the area where the code image is included, if the code image decoding unit is successful in decoding only the partial area of the code image.

According to this invention, when source data can not be taken out of the code image because there is a crease on the code image part of the copied matter that becomes the original or the code image is contaminated due to some cause, the code image can be deleted from the original image data. In the above case, it is unnecessary to distribute the copied matter out of which source data can not be taken to the users for distribution. Moreover, since the distributor can select a deletion pattern of the code image, it is possible to improve the convenience of the image forming apparatus that can treat the code image.

Further features of the present invention will become apparent form the following description of exemplary embodiments with reference to the attached drawings.

DESCRIPTION OF THE EMBODIMENTS

The best mode for carrying out the present invention will be described below with reference to the drawings.

Embodiment 1

<Printing System (FIG. 1)>

Figure 1:
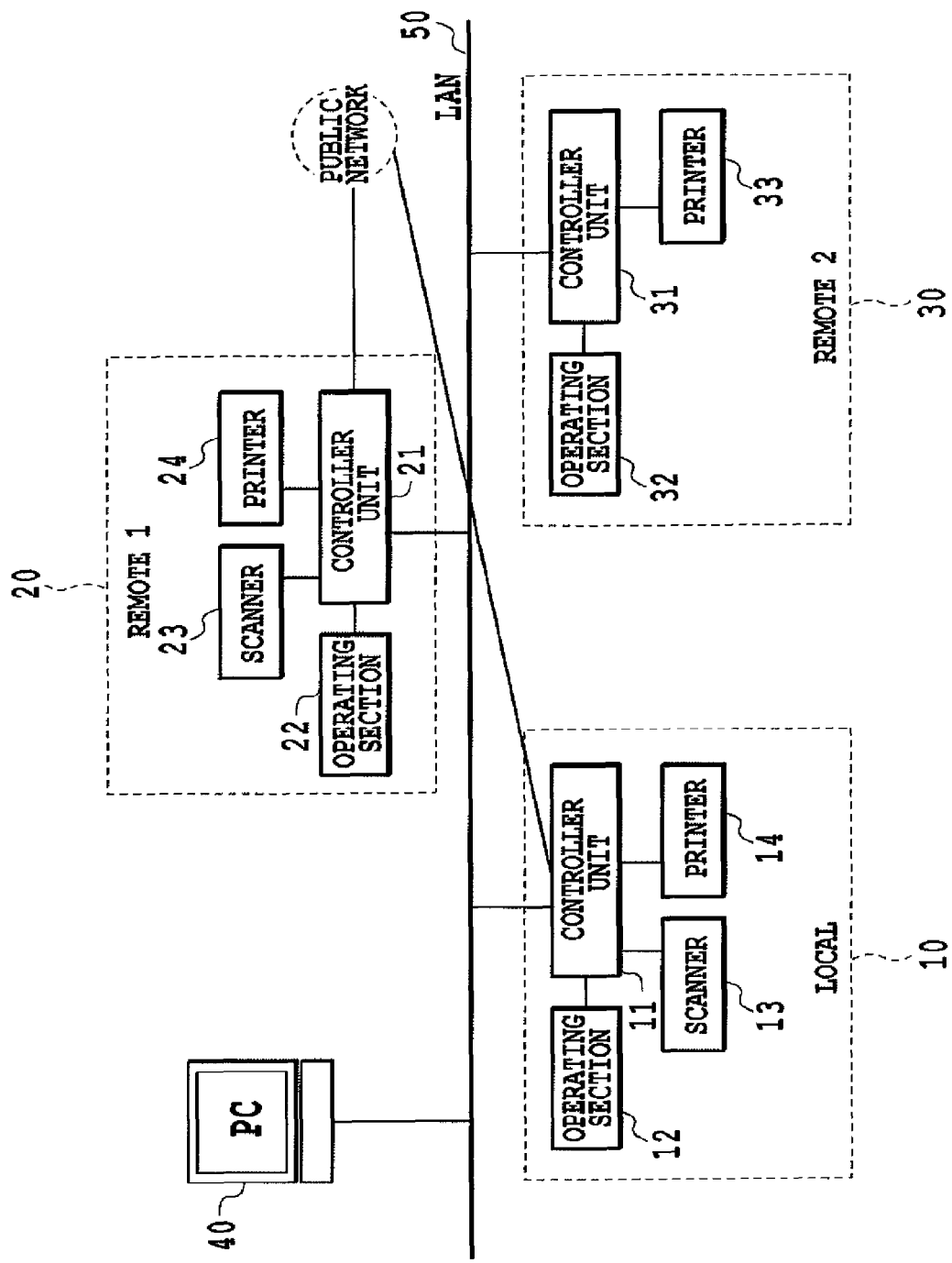
FIG. 1 is a block diagram showing an image forming system according to the present invention.

An embodiment 1 will be described below in detail with reference to the drawings. FIG. 1 is a block diagram showing a printing system according to the embodiment of the invention. In this system, a host computer (PC) 40 and three image forming apparatuses 10, 20 and 30 are connected to a LAN 50, although the number of connections in the printing system of the invention is not limited to three. As a connection method in this embodiment, the LAN is applied, but the connection method is not limited to this. For example, any network such as WAN (public network), a serial transmission method such as a USB, and a parallel transmission method such as Centronics or SCSI may be applicable.

The host computer (hereinafter referred to as a PC) 40 has a function of personal computer. This PC 40 sends or receives a file or an electronic mail via the LAN 50 or WAN, using an FTP or SMB protocol. Also, the PC 40 can make a print instruction via a printer driver to the image forming apparatuses 10, 20 and 30.

The image forming apparatus 10 and the image forming apparatus 20 have the same configuration. The image forming apparatus 30 has only a print function but does not have a scanner section, which the image forming apparatus 10 or 20 has. In the following, for the sake of simpler explanation, the configuration of the image forming apparatus will be described in detail by paying attention to the image forming apparatus 10 of the image forming apparatuses 10 and 20.

The image forming apparatus 10 comprises a scanner 13 that is an image input device, a printer 14 that is an image output device, an operating section 12 that is a user interface (UI), and a controller unit (Controller Unit) 11. The controller unit 11 is connected to the scanner 13 and the printer 14 and controls the overall operation of the image forming apparatus 10.

The image forming apparatus 20 comprises a scanner 23 that is an image input device, a printer 24 that is an image output device, an operating section 22 that is a user interface (UI), and a controller unit (Controller Unit) 21. The controller unit 21 is connected to the scanner 23 and the printer 24 and controls the overall operation of the image forming apparatus 20.

The image forming apparatus 30 comprises a printer 33 that is an image output device, an operating section 32 that is a user interface (UI), and a controller unit (Controller Unit) 31 that is connected to all of them and controls the overall operation of the image forming apparatus 30.

<Image forming apparatus 10 (FIG. 2)>

Figure 2:
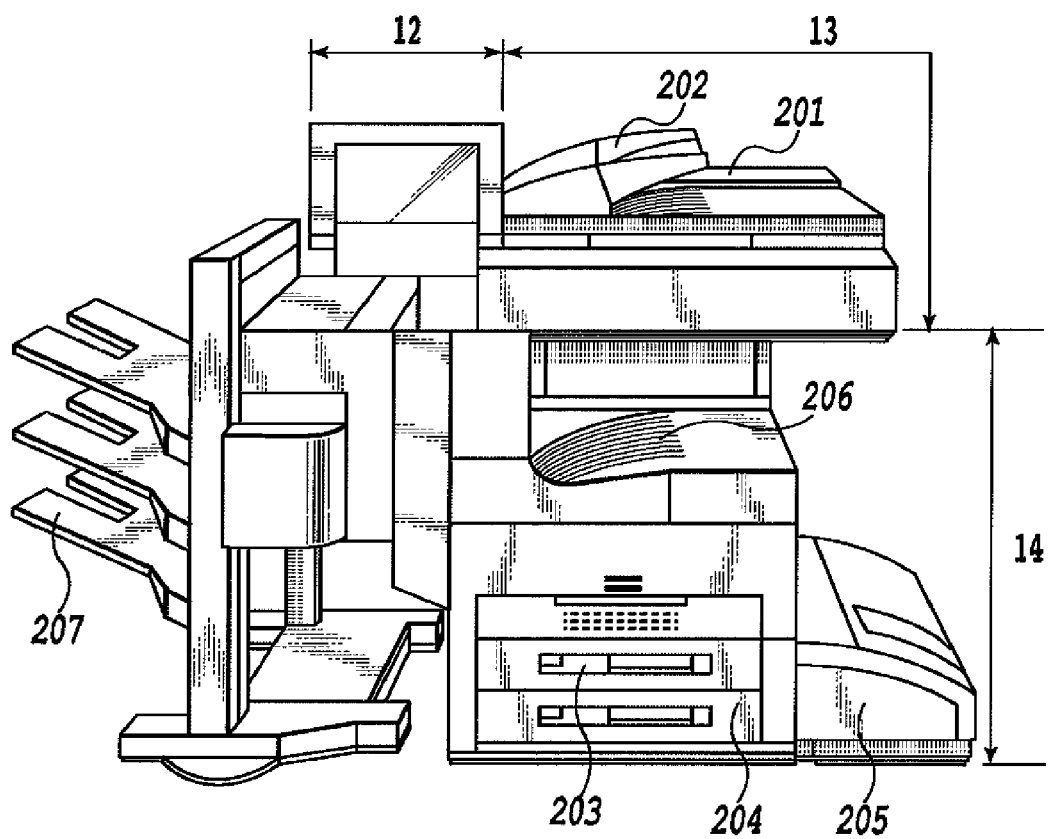
FIG. 2 is an appearance view of an input/output device in the image forming apparatus according to the invention.

FIG. 2 shows the appearance of the image forming apparatus 10. The scanner 13 inputs the reflected light obtained by exposing and scanning an image on the original into a CCD to convert information of the image into an electrical signal. The scanner section further converts the electrical signal into a luminance signal of each color of R, G and B, and outputs the luminance signal as image data to the controller unit 11.

The original is set on a tray 202 of an original feeder 201. If the user instructs the start of reading from the operating section 12, an original read instruction is given from the controller unit 11 to the scanner 13. Upon receiving this instruction, the scanner 13 performs an original scanning operation by feeding the originals one by one from the tray 202 of the original feeder 201. A method of reading the originals may not be the automatic feeding with the original feeder 201, but may be one in which the original is scanned as an exposure section is moved with the original laid on a glass plate, not shown.

The printer 14 is an image forming device for forming the image data received from the controller unit 11 on the paper. In this embodiment, an image forming method is electro photography, using a photoconductor drum and a photoconductor belt, but the invention is not limited to this method. For example, an ink jet method for performing the printing on the paper by discharging the ink from an array of fine nozzles is also applicable. Also, the printer 14 is provided with a plurality of paper cassettes 203, 204 and 205 capable of selecting different paper sizes or different paper orientations. The printed paper not subjected to post-processing is outputted to a paper output tray 206. A post-processing part 207 performs the post-processing for the paper after printing. The examples of post-processing may include stapling, punching or cutting the exhausted paper.

<Detailed Explanation of Controller Unit 11 (FIG. 3)>

Figure 3:
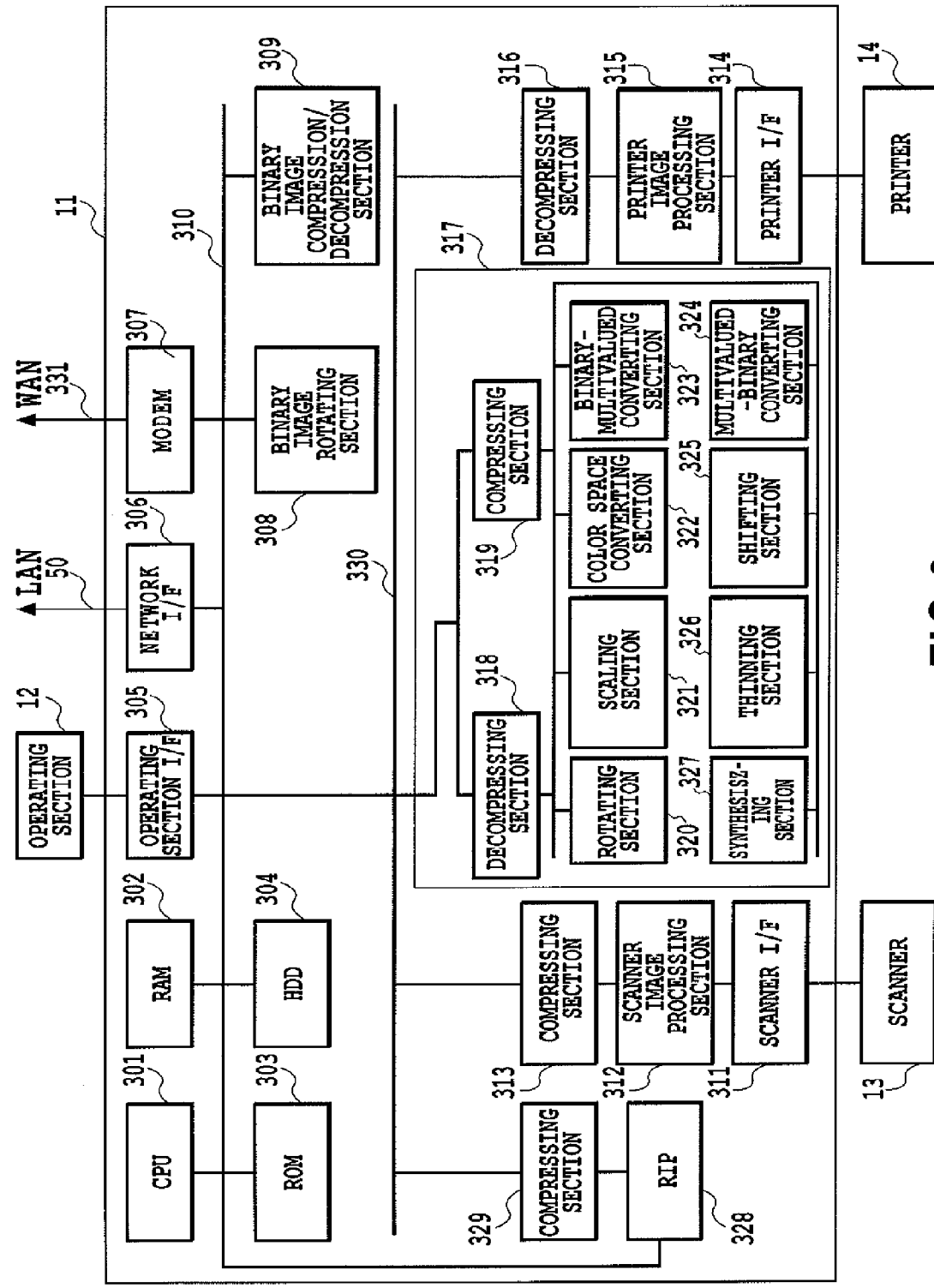
FIG. 3 is a block diagram showing the image forming apparatus according to the invention.

FIG. 3 is a block diagram for explaining in more detail the configuration of the controller unit 11 in the image forming apparatus 10.

The controller unit 11 is electrically connected to the scanner 13 and the printer 14, while being connected to the PC 40 or an external apparatus via the LAN 50 or WAN 331. Thereby, the image data or device information can be inputted or outputted.

A CPU 301 generally controls the access to various kinds of device being connected, based on a control program or the like stored in a ROM 303, and also generally controls various kinds of process performed within the controller. A RAM 302 is a system work memory for the CPU 301 to operate, and for temporarily storing image data. This RAM 302 is composed of an SRAM for holding the stored contents even after power off, or a DRAM in which the stored contents are erased after power off. A ROM 303 stores a boot program of the apparatus. An HDD 304 is a hard disk drive that can store the system software or image data.

An operating section I/F 305 is the interface for connecting a system bus 310 and the operating section 12. This operating section I/F 305 receives the image data displayed on the operating section 12 from the system bus 310 and outputs it to the operating section 12, and outputs the information inputted from the operating section 12 to the system bus 310.

A network I/F 306 is connected to the LAN 50 and the system bus 310 to input or output the information. A modem 307 is connected to the WAN 331 and the system bus 310 to input or output the information. A binary image rotating section 308 transforms the direction of image data before sending. A binary image compression/decompression section 309 transforms the resolution of image data before sending to the predetermined resolution or the resolution according to the ability of the party at the other end. In the compression and decompression, a JBIG, MMR, MR or MH method may be employed. An image bus 330 is a transmission path for sending or receiving the image data, and composed of a PCI bus or IEEE 1394.

A scanner image processing section 312 makes the correction, working and editing of the image data received via a scanner I/F 311 from the scanner 13. The scanner image processing section 312 determines whether or not the received image data is color original or black-and-white original, or character original or photographic original. And the determination result is associated with the image data. Such associated information is called attribute data. The details of the process performed in this scanner image processing section 312 will be described later.

Figure 4:
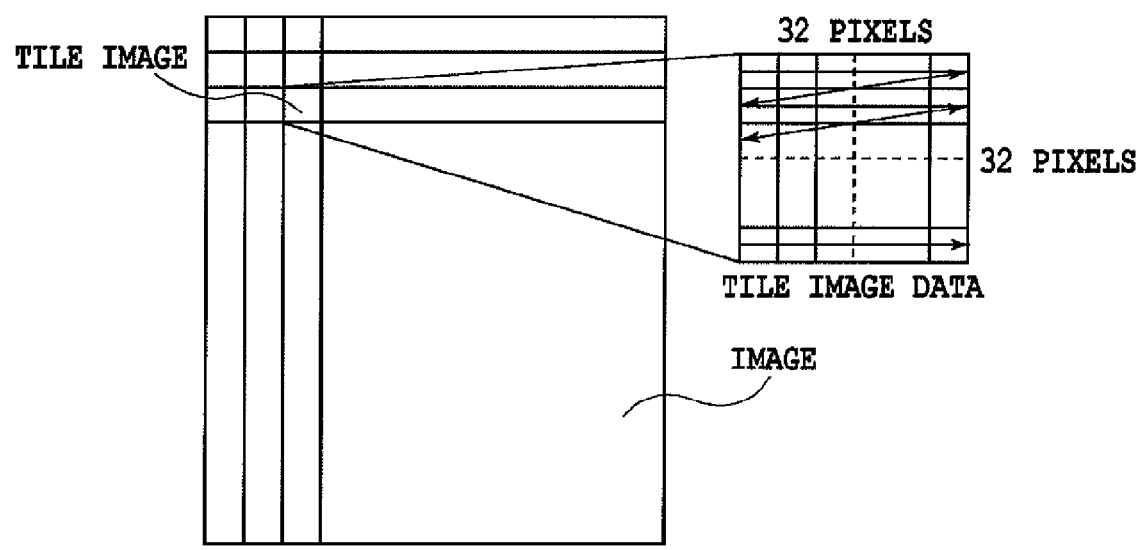
FIG. 4 is a diagram showing conceptually tile data according to the invention.

A compressing section 313 receives the image data and divides it into block units of 32 pixels×32 pixels. This image data of 32 pixels×32 pixels is called tile data. FIG. 4 shows this tile data conceptually. In the original (paper medium before reading), an area corresponding to this tile data is called a tile image. To the tile data, the average luminance information on the block of 32 pixels×32 pixels and the coordinate position of the tile image on the original are appended as the header information. Further, the compressing section 313 compresses the image data composed of plural pieces of tile data. A decompressing section 316 decompresses the image data composed of plural pieces of tile data, performs the raster expansion, and sends data to a printer image processing section 315.

A printer image processing section 315 receives the image data sent from the decompressing section 316, and performs the image processing for the image data by referring to the attribute data associated with this image data. The image data after the image processing is outputted via a printer I/F 314 to the printer 14. The details of the process performed in this printer image processing section 315 will be described later.

An image conversion part 317 makes a predetermined conversion process for the image data. This image conversion part comprises the following processing parts.

A decompressing section 318 decompresses the received image data. A compressing section 319 compresses the received image data. A rotating section 320 rotates the received image data. A scaling section 321 makes a resolution transformation process (e.g., from 600 dpi to 200 dpi) for the received image data. A color space converting section 322 transforms a color space of the received image data. This color space converting section 322 can make a well-known substratum skip process using a matrix or table, a well-known LOG transformation process (RGB→CMY), or a well-known output color correction process (CMY→CMYK). A binary-multivalued converting section 323 converts the received image data of two gray levels to the image data of 256 gray levels. Conversely, a multivalued-binary converting section 324 converts the received image data of 256 gray levels to the image data of two gray levels through an error diffusion process or the like.

A synthesizing section 327 synthesizes two received image data to generate one image data. In synthesizing two image data, a method of making the average value of luminance values for the pixels of synthesizing object a synthesized luminance value, or a method of making the luminance value of the pixel lighter in the luminance level a synthesized luminance value of pixels may be applied. Also, a method of making the luminance value of the pixel darker in the luminance level a synthesized luminance value of the pixels may be applied. Further, a method of deciding the luminance value after synthesizing through the logical sum operation, logical product operation or exclusive OR operation on the pixels of synthesizing object may be applied. All of these synthesizing methods are well known. A thinning section 326 thins the pixels of the received image data to transform the resolution and generate the ½, ¼ or ⅛ image data. A shifting section 325 adds or deletes a marginal portion to or from the received image data.

An RIP 328 connected to the compressing section 329 receives intermediate data generated based on the PDL code data sent from the PC 40 and generates the bit map data (multi-value).

<Detailed Explanation of Scanner Image Processing Section 312 (FIG. 5)>

Figure 5:
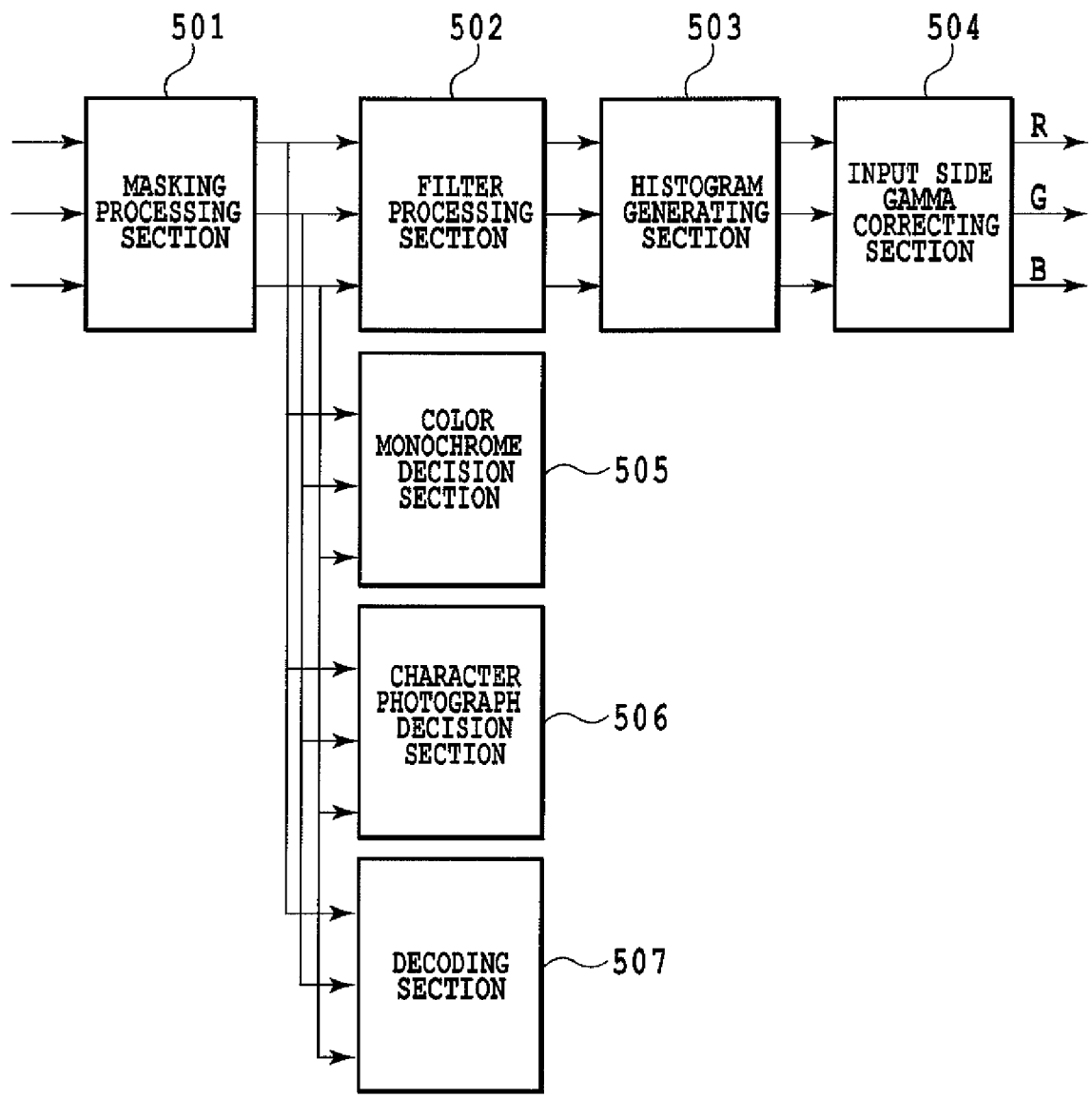
FIG. 5 is a block diagram of a scanner image processor according to the invention.

FIG. 5 shows the internal configuration of the scanner image processing section 312.

The scanner image processing section 312 receives the image data composed of a luminance signal of 8 bits for each of RGB. This luminance signal is converted into a normal luminance signal not dependent on the filter color of CCD by a masking processing section 501.

A filter processing section 502 corrects the spatial frequency of the received image data arbitrarily. This processing part makes an arithmetical operation, using a 7×7 matrix, for example, on the received image data. Incidentally, in a copier or decoder, a character mode, a photograph mode, or a character/photograph mode can be selected as the copy mode by pressing an original selection tab 704 in FIG. 7. Herein, when the character mode is selected by the user, the filter processing section 502 applies a character filter over the entire image data. Also, when the photograph mode is selected, it applies a photographic filter over the entire image data. Also, when the character/photograph mode is selected, it switches the filters adaptively for each pixel according to a character photograph determination signal (part of attribute data). Namely, it is decided whether or not the photographic filter or character filter is applied for each pixel. For the photographic filter, a factor for smoothing only the high frequency component is set up. This is intended to make roughness of the image less conspicuous. Also, for the character filter, a factor for making higher edge enhancement is set up. This is intended to enhance the sharpness of character.

A histogram generating section 503 samples the luminance data of each pixel making up the received image data. More particularly, the luminance data within a rectangular area surrounded by the start point and the end point designated in a main scanning direction and a sub-scanning direction is sampled at a constant pitch in the main scanning direction and the sub-scanning direction. And the histogram data is generated based on the sampled results. The generated histogram data is used to estimate a substratum level in performing the substratum skip process. An input side gamma correcting section 504 makes the gamma correction for conversion to the luminance data having the non-linear characteristic, using a table or the like.

A color monochrome decision section 505 determines whether or not each pixel making up the received image data is chromatic or achromatic color, and has the image data associated with the determination result as a color monochrome determination signal (part of attribute data).

A character photograph decision section 506 determines whether or not each pixel making up the image data is pixel composing the character, pixel composing the dot, pixel composing the character in the dots or pixel making up the solid image, based on the pixel value of each pixel and the pixel values of peripheral pixels around each pixel. Any other pixel is the pixel making up a white area. And the image data is associated with the determination result as a character photograph determination signal (part of attribute data).

A decoding section 507 detects the existence of code image data, if it exists within the image data outputted from the masking processing section 501. And the detected code image data is decoded to take out the information.

<Detailed Explanation of Printer Image Processing Section 315 (FIG. 6)>

Figure 6:
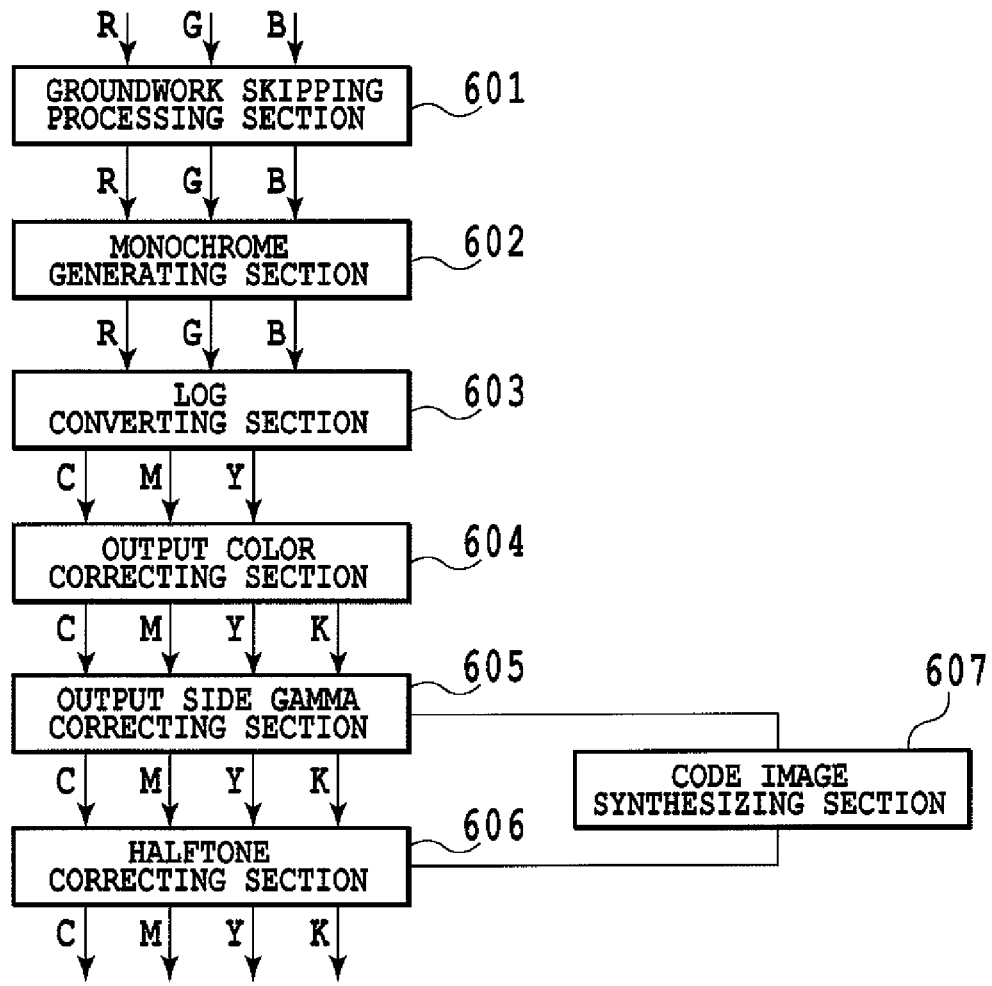
FIG. 6 is a block diagram of a printer image processor according to the invention.

FIG. 6 shows a processing flow performed in the printer image processing section 315.

A groundwork skipping processing section 601 skips (removes) the substratum color of image data, using a histogram generated by the scanner image processing section 312. A monochrome generating section 602 converts color data into monochrome data. A Log converting section 603 transforms the luminance density. This Log converting section 603 transforms the image data inputted in RGB into the image data of CMY, for example. An output color correcting section 604 corrects the output color. For example, it converts the image data inputted in CMY into the image data of CMYK, using a table or matrix. An output side gamma correcting section 605 makes the correction for a signal value inputted into this output side gamma correcting section 605 to be proportional to the reflected density value after copy output. A code image synthesizing section 607 synthesizes the code image data generated through an <encoding process>, as will be described later, and the (original) image data. A halftone correcting section 606 makes a halftone process according to the levels of gray scale in the printer unit for output. For example, the received image data having high level of gray scale is converted into the values of binary or 32-level gray scale.

Each processing part in the scanner image processing section 312 or printer image processing section 315 may directly output the received image data without processing it. Such a process in which the processing part passes data without processing is represented as "through the processing part" in the following.

<Encoding Process>

The CPU 301 can control an encoding process for the predetermined information (this predetermined information includes the device number, print time information, user ID information and the document) to generate the code image data.

In this specification, the code image unit the image such as two-dimensional code image or bar code image, or the electronic watermark image generated by an electronic watermark technique.

Further, the CPU 301 can perform the control to send the generated code image data to the code image synthesizing section 607 within the printer image processing section 315, using a data bus, not shown.

The above control (generation control for code image, and sending control) is performed by executing a program stored in the RAM 302.

The explanation of the controller unit 11 is made as above.

<Explanation of Operation Screen>

Figure 7:
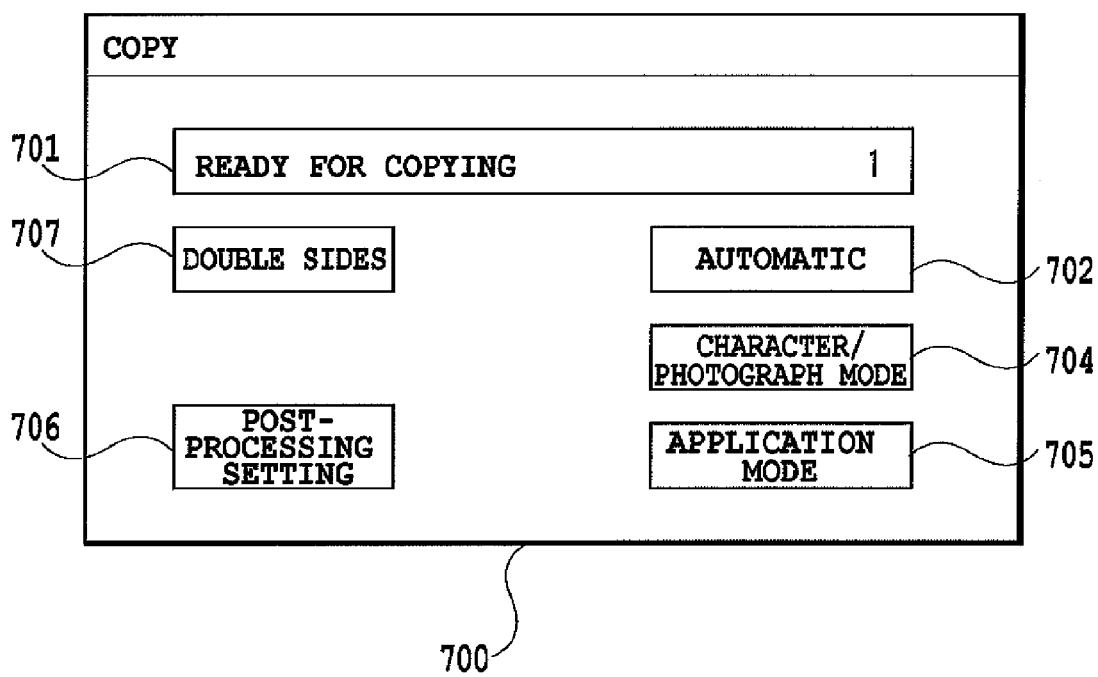
FIG. 7 is an explanatory view of an operating section according to the invention.

FIG. 7 shows an initial screen 700 in the image forming apparatus 10. A region 701 indicates whether or not the image forming apparatus 10 is ready for copying, with the set number of copies. An original selection tab 704 is a tab for selecting the type of original, in which if this tab is pressed, a selection menu for three kinds of character, photograph and character/photograph modes pops up. An application mode tab 705 is a tab for setting various kinds of image editing process. A post-processing tab 706 is a tab for making the setting of various kinds of finishing. A duplex setting tab 707 is a tab for setting the duplex reading and the duplex printing. A reading mode tab 702 is a tab for selecting the original reading mode. If this tab is pressed, a selection menu for three kinds of color/black/automatic (ACS) modes pops up. If the color mode is selected, the color copy is performed, and if the black mode is selected, the monochrome copy is performed. Also, if the ACS mode is selected, the copy mode is decided according to a monochrome color determination signal.

Figure 8:
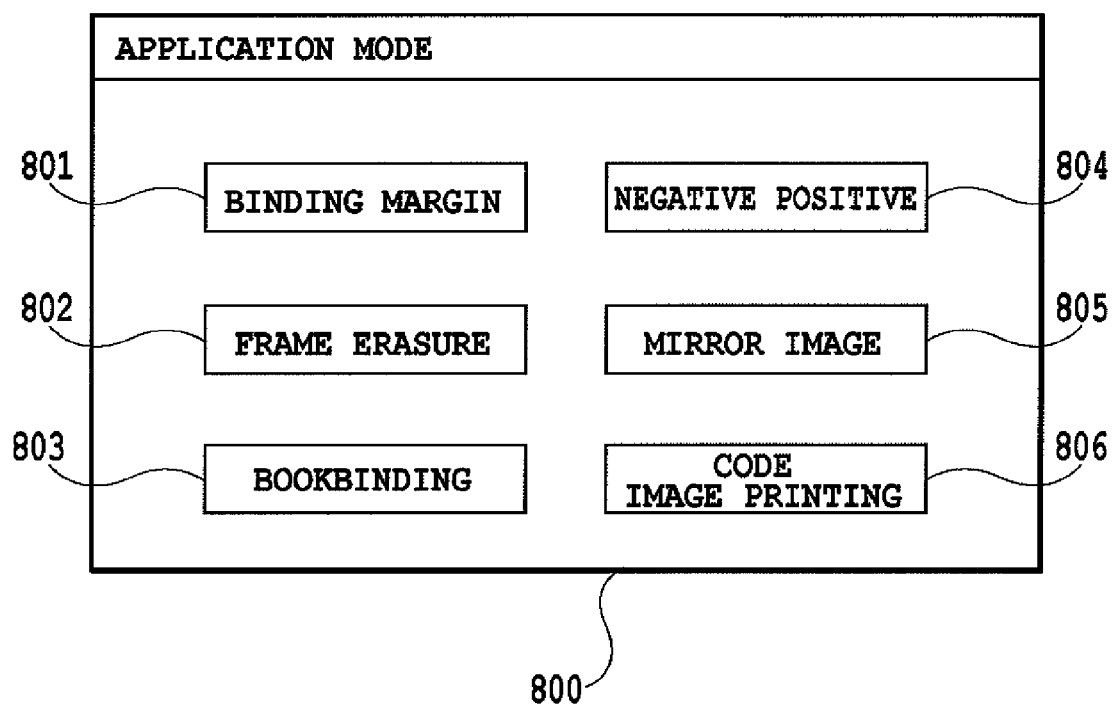
FIG. 8 is an explanatory view of the operating section according to the invention.

FIG. 8 shows an application mode setting screen 800 that is displayed when pressing the application mode tab 705 as shown in FIG. 7. For example, the application mode setting screen 800 has a binding margin setting tab 801, a frame erasure setting tab 802, a bookbinding setting tab 803, a negative-positive setting tab 804 and a mirror image setting tab 805. The binding margin setting tab 801 involves printing the original image, shifted up, down, left or right, on the output paper at the time of outputting. Also, the frame erasure setting tab 802 involves specifying a frame for the original image and making the pixel outside the frame the white pixel. And the bookbinding setting tab 803 involves bookbinding the original image for output. And the negative-positive setting tab 804 involves reversing the original image in white and black, and the mirror image setting tab 805 involves printing the mirror image of the original image by left and right reversal.

If the negative-positive setting tab 804 is pressed, a negative-positive ON/OFF screen, not shown, is displayed to allow selection of whether the negative-positive is outputted. The initial value is set not to be negative-positive. If the mirror image setting tab 805 is pressed, a mirror image ON/OFF screen, not shown, is displayed to allow selection of whether or not the mirror image is outputted. The initial value is set not to output the mirror image. Herein, a code image printing tab 806 involves setting a mode for newly overlaying the code image on the original image. The information newly converted into the code image may include a document file stored in the HDD 304 within the PC 40 or the image forming apparatus or a character string inputted from a virtual keyboard, not shown. The invention is an example of creating the original on which the code image is printed.

Figure 9:
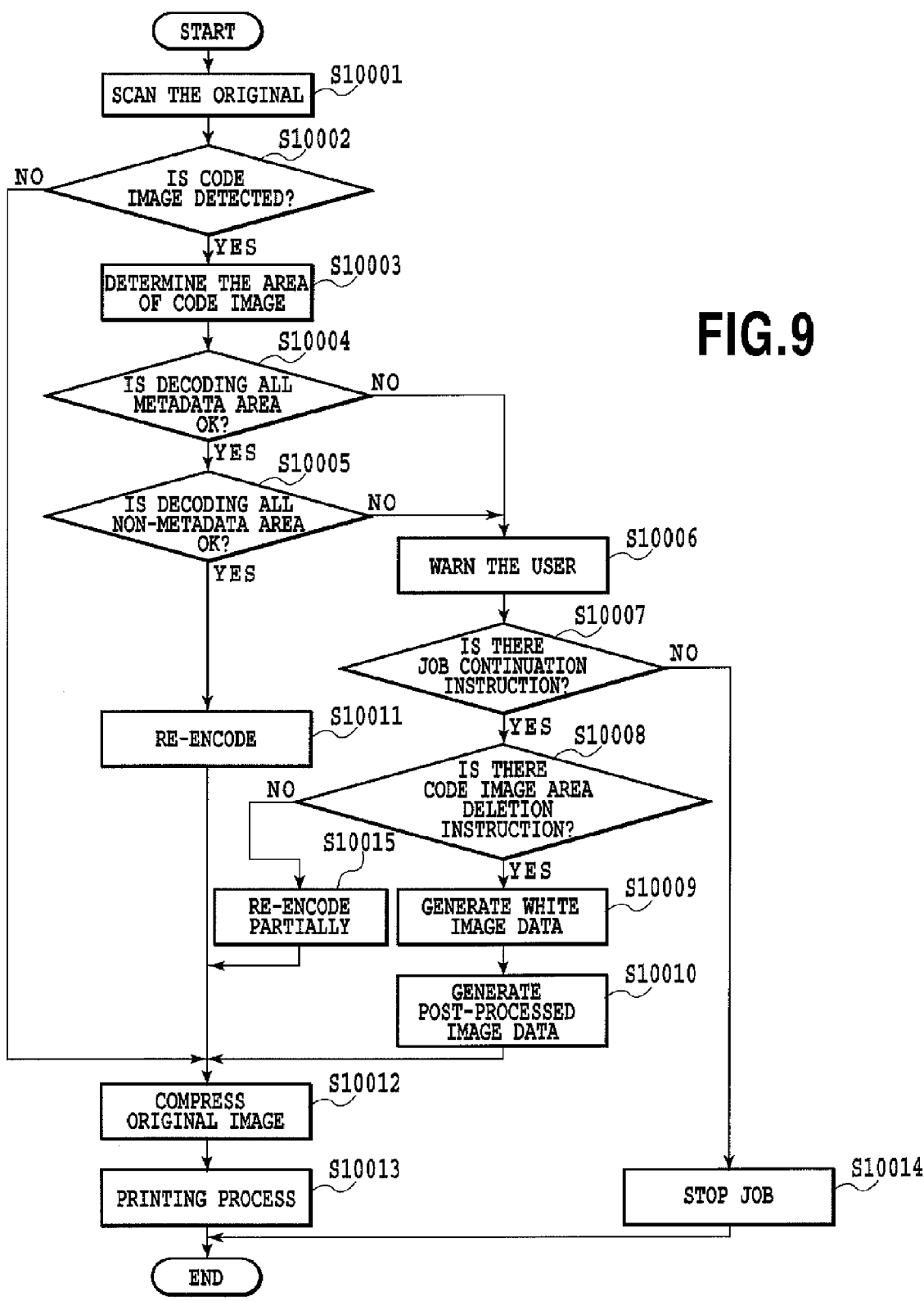
FIG. 9 is a flowchart according to the invention.

FIG. 9 is a flowchart for a process of inputting the original on which the code image is printed and outputting the copied matter.

At S10001, the CPU 301 performs the control to send the original read by the scanner 13 as image data via the scanner I/F 311 to the scanner image processing section 312. The scanner image processing section 312 processes this image data as shown in FIG. 5 to generate the attribute data together with the new image data. Also, the image data is associated with this attribute data. Further, at S10002, the decoding section 507 within the scanner image processing section 312 detects the existence of code image data, if any.

Figure 12:
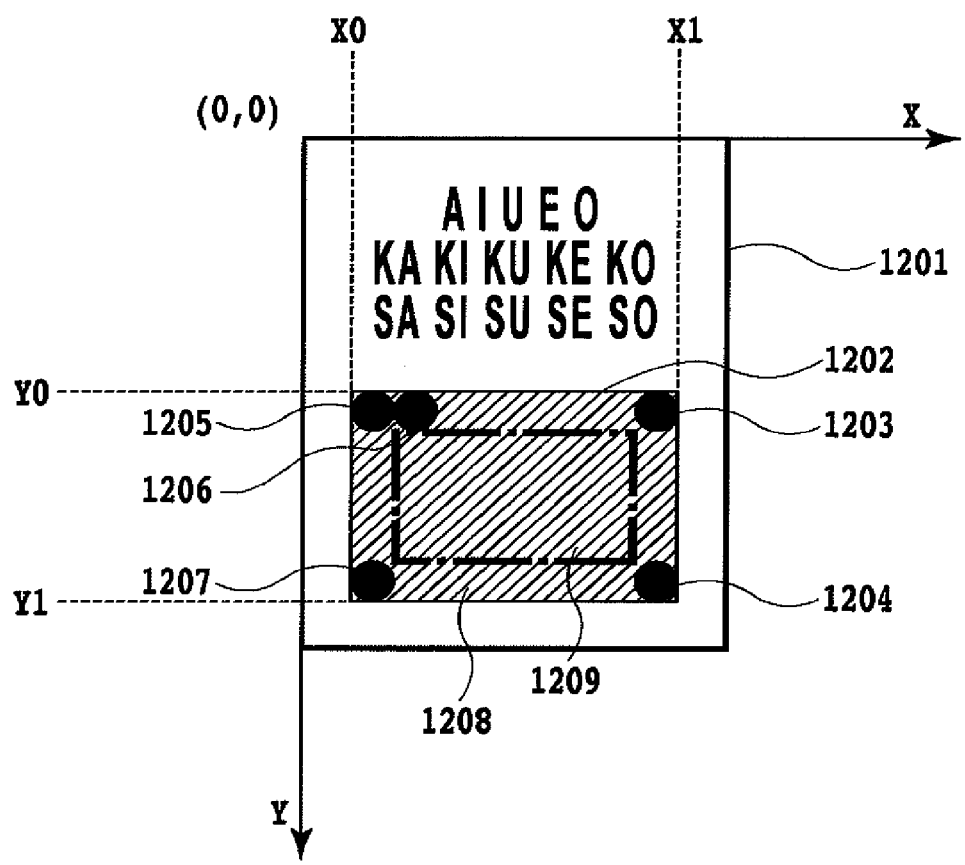
FIG. 12 is a view of a code image area according to the invention.

Herein, FIG. 12 shows an original image stored in the RAM 302. With the upper left corner of the original image 1201 as an origin, the x axis is taken along the main scanning direction and the y axis is taken along the sub-scanning direction. An code image data area 1202 is a rectangular area (area surrounded by X0, X1, Y0 and Y1), which is determined by the decoding section 507 detecting the code image detection marks 1203 to 1207, as shown in FIG. 12. The upper, lower, left and right of the code image data can be determined by detecting the code image detection marks present consecutively such as 1205 and 1206 (determined as upper left). And the code image data area 1202 includes a metadata area 1208 and a non-metadata area 1209. The non-metadata area 1209 is the dot line area surrounded by the code image detection marks 1203 to 1205 and 1207 at four corners within the code image data, and the metadata area 1208 is the other area.

If the decoding section 507 detects the code image data at S10002 as shown in FIG. 9, the CPU 301 transfers to S10003 to determine the area of original image in the detected code image data and store it in the RAM.

And at S10004, the decoding section 507 decodes the metadata area in the code image data. If all the metadata area is successfully decoded at S10004, the CPU 301 sends the decoded metadata to the RAM 302, using the data bus, not shown, and shifts the processing to S10005. Also, if there is any metadata area that fails in decoding at S10004, the CPU 301 decodes and sends only a part of the metadata area that is decodable to the RAM 302, using the data bus, not shown, and shifts the processing to S10006.

At S10005, the decoding section 507 decodes the non-metadata area within the code image data. If all the non-metadata area is successfully decoded, the CPU 301 sends the decoded non-metadata (such as document data or character code) to the RAM 302, using the data bus, not shown, and shifts the processing to S10011. If there is any non-metadata area that fails in decoding at S10005, the CPU 301 decodes and sends only a part of the non-metadata area that is decodable to the RAM 302, using the data bus, not shown, and shifts the processing to S10006. At S10011, the CPU 301 performs the control to re-encode the decoded metadata and non-metadata to generate the code image and send the generated re-encoded image data to the code image synthesizing section 607 within the printer image processing section 315, and shifts the processing to S10012.

Figure 10:
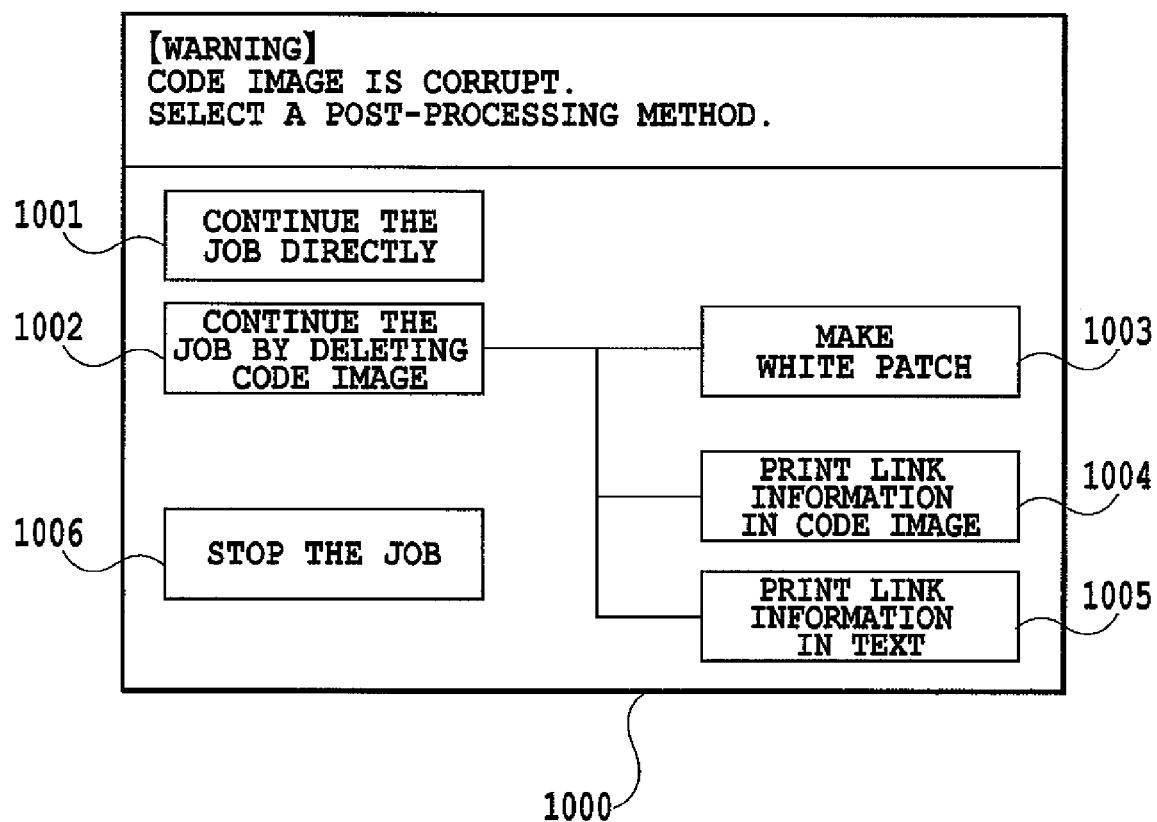
FIG. 10 is a view showing a job execution selection screen according to the invention.

At S10006, the CPU 301 warns the user of a failure in decoding the code image data on a job execution selection screen as shown in FIG. 10, and prompts the user to select a post-processing method.

And if the user makes a job continuation instruction on the job execution selection screen at S10007 as indicated in FIG. 9, the CPU shifts the processing to S10008, or if the user makes a job stop instruction, the CPU shifts the processing to S10014 to stop the job.

If the user makes an instruction to delete the code image area at S10008, the CPU shifts the processing to S10009, or if not, the CPU shifts the processing to S10015.

At S10015, the CPU 301 reads the metadata decoded at 510004 from the RAM 302, using the data bus, not shown.

Also, at S10015, the CPU 301 reads the non-metadata decoded at S10005 from the RAM 302, using the data bus, not shown.

Further, at S10015, the CPU 301 re-encodes the read metadata and non-metadata to generate the code image. At this time, the code image is generated, using all the code image data area 1202 on which the code image of all the metadata and non-metadata (all the source data) is printed. Accordingly, the CPU 301 can re-encode the metadata and non-metadata (less than all the source data) read at S10015 by appending the error correcting codes in greater amount by the code image data area that fails in decoding in this case. Thereby, even if the source code image data is incompletely decoded, the CPU can re-encode the data by appending more error correcting codes than contained in the source code image data.

Thereafter, the CPU 301 performs the control to send the generated re-encoded image data to the code image synthesizing section 607 within the printer image processing section 315, and shifts the processing to S10012.

At S10009, the CPU 301 generates a white image having the same size as the size of the code image data area made up of the white pixels. To delete the code image from the image after raster expansion (original image after image processing), such white image is generated. And at S10010, the post-processing for the white image is performed, as needed, and the CPU performs the control to send the image data after post-processing as the post-processed image data to the code image synthesizing section 607 within the printer image processing section 315, and shifts the processing to S10012. The post-processing for the white image will be described later using FIG. 12.

At S10012 as indicated in FIG. 9, the compressing section 313 divides the image data generated by the scanner image processing section 312 into block units of 32 pixels×32 pixels to generate the tile data. Further, the compressing section 313 compresses the image data after the scanner image processing made up of plural pieces of tile data. The CPU 301 performs the control to send and store the image data compressed by the compressing section 313 to and in the RAM 302. The image data after the scanner image processing is sent to the image conversion part 317 to perform the image processing, as needed, and then sent to the RAM 302 again where it is stored. At S10013, the CPU 301 performs the control to send the compressed image data stored in the RAM 302 to the decompressing section 316. Further, at this step, the decompressing section 316 decompresses the compressed image data. Further, the decompressing section 316 makes the raster expansion of decompressed image data made up of plural pieces of tile data. The image data after raster expansion is sent to the printer image processing section 315. The printer image processing section 315 edits the image data according to the attribute data associated with the image data after raster expansion. This process is shown in FIG. 6.

Herein, the code image data generated at S10011 as indicated in FIG. 9 or the post-processed image data generated at S10010 and the image data after raster expansion are synthesized. More particularly, the code image synthesizing section 607 synthesizes the image data outputted from the output side gamma correcting section 605 and the code image data generated at S10011 or the post-processed image data generated at S10010. This code image synthesizing section 607 overwrites the original image data with the code image data generated at S10011 or the post-processed image data generated at S10010. That is, if overwritten, the original image data is destroyed in the area of the code image data generated at S10011 or the post-processed image data generated at S10010.

And the halftone correcting section 606 makes a halftone process for the composite image data obtained by synthesizing according to the levels of gray scale for the printer unit for output. The composite image data after the halftone process is sent via the printer I/F 314 to the printer 14, which then prints the composite image data on the output paper.

FIG. 10 shows a job execution selection screen 1000 that is displayed by the CPU 301 at S10006. If a job continuation button 1001 is pressed, the CPU 301 performs the control to continue the printing without making the post-processing for the code image data area (i.e., directly transfers from S10008 to S10012).

If a code image deletion and job continuation button 1002 is pressed, any one of a white patch button 1003, a metadata encoding button 1004 and a metadata text button 1005 can be selected. The metadata encoding button 1004 or the metadata text button 1005 is displayed in gray out so that it can not be selected unless the metadata area is successfully decoded at S10004 in FIG. 9. This control is performed by the CPU.

If the user selects any one of the white patch button 1003, the metadata encoding button 1004 and the metadata text button 1005, the CPU 301 receiving the selection performs the post-processing at S10010 in FIG. 9. Also, if the user presses the job stop button 1006, the CPU 301 receiving the pressing performs the control to stop the printing process. In an example of FIG. 10, it is supposed that the non-metadata is the document file, and the metadata is the URL of the document file. Therefore, the user can easily understand the wording of the metadata encoding button 1004 and the metadata text button 1005, but this is one example and does not limit the embodiment.

Figure 11:
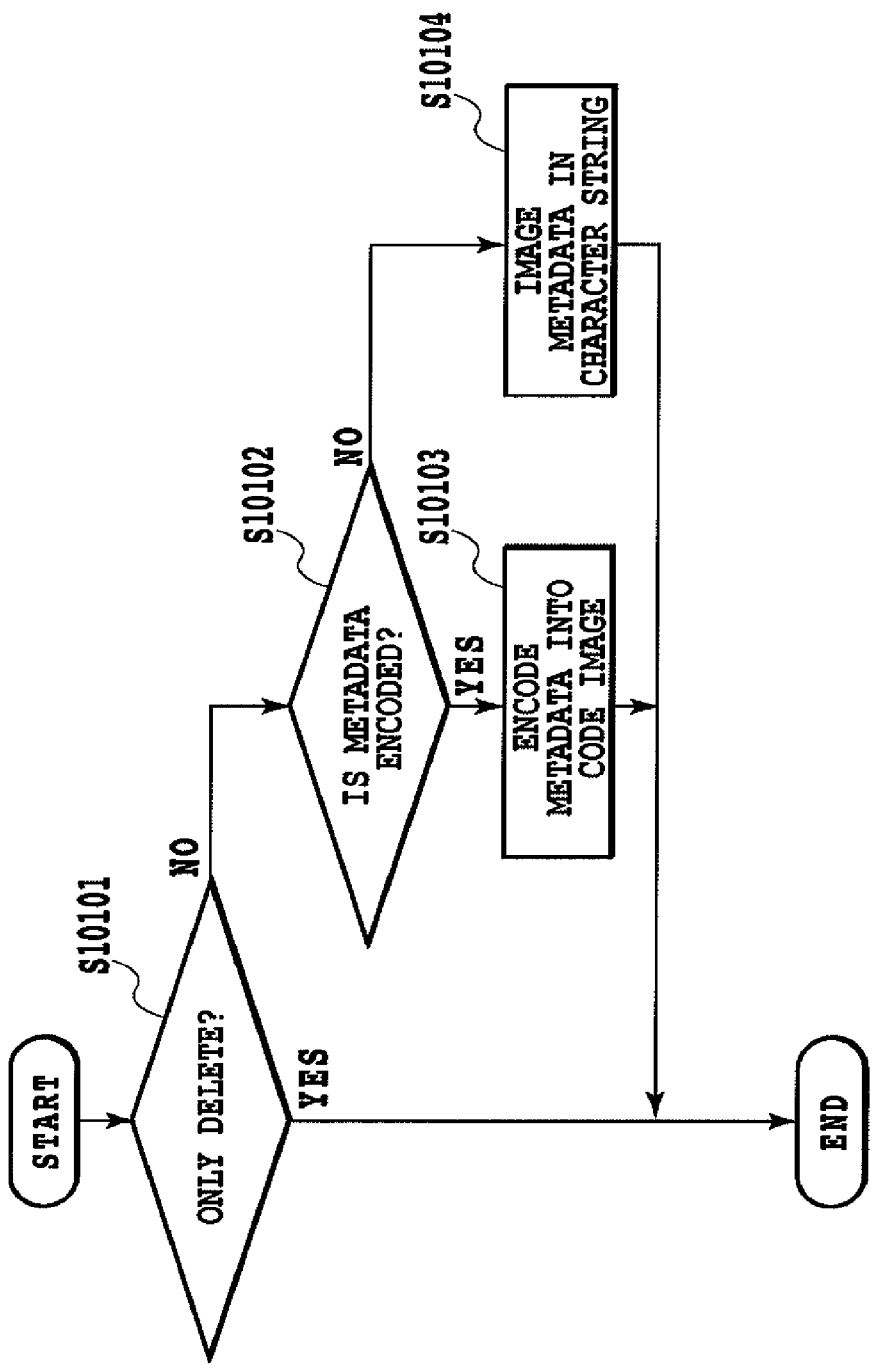
FIG. 11 is a flowchart according to the invention.

FIG. 11 is a flowchart for post-processing at S10010 in FIG. 9, on the assumption of FIG. 10.

At S10101 as indicated in FIG. 11, the CPU 301 determines whether or not the white patch button 1003 as shown in FIG. 10 is pressed. If the white patch button 1003 is pressed, the CPU does not perform the post-processing and exits out of the flow. The white image data generated at S1009 is outputted as the post-processed image data at S10012.

If the white patch button 1003 is not pressed, the CPU shifts the processing to S10102. At S10102, the CPU 301 determines whether or not the metadata encoding button 1004 as shown in FIG. 10 is pressed. And if the metadata encoding button 1004 is pressed, the CPU shifts the processing to S10103, or if the metadata encoding button 1004 is not pressed, the CPU shifts the processing to S10104.

At S10103, the CPU 301 executes a program stored in the RAM 302 for the decoded metadata stored in the RAM 302 at S10004 to generate the code image data in which only the metadata is decoded. And this code image data is outputted as the post-processed image data.

At S10104, the CPU 301 executes a program stored in the RAM 302 for the decoded metadata stored in the RAM 302 at S10004 to generate the text image data of metadata. And this text image data is outputted as the post-processed image data at S10012.

Figure 13:
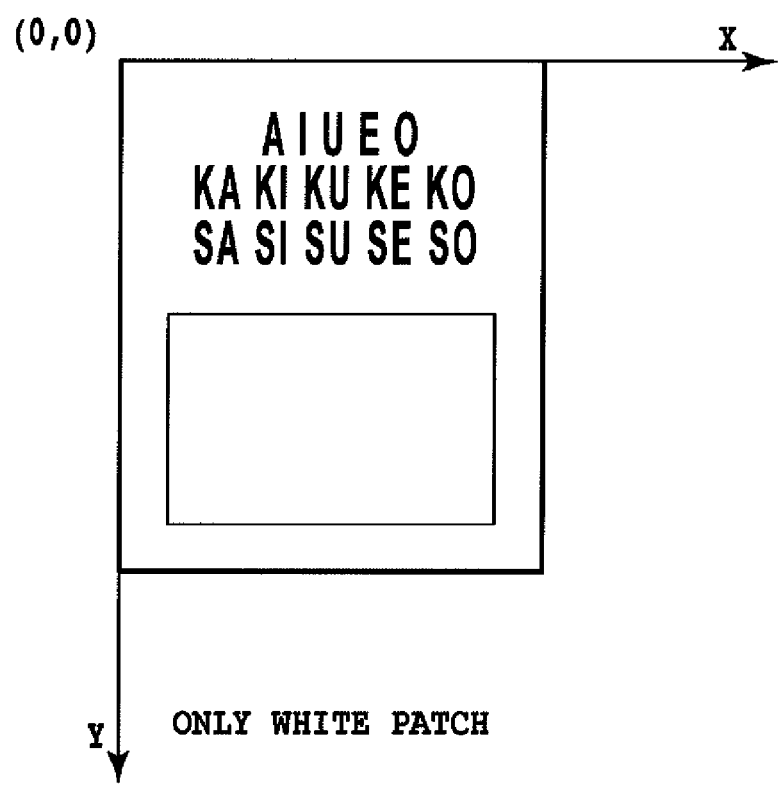
FIG. 13 is a view of a printed image after post-processing according to the invention.
Figure 14:
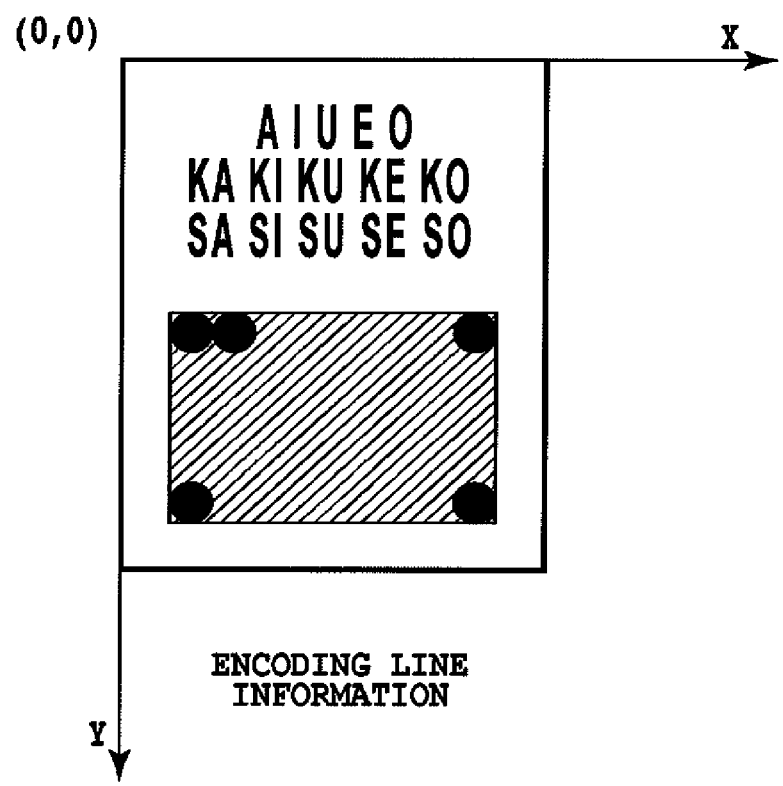
FIG. 14 is a view of the printed image after post-processing according to the invention.
Figure 15:
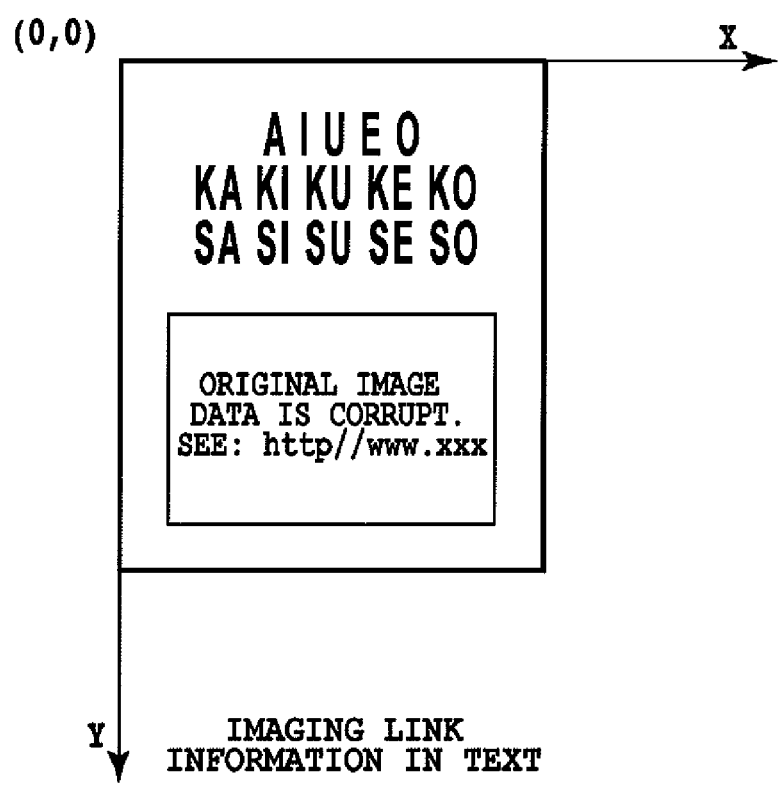
FIG. 15 is a view of the printed image after post-processing according to the invention.

FIGS. 13 to 15 show the images immediately before printing. FIG. 13 is the result where the white patch button 1003 as shown in FIG. 10 is pressed, FIG. 14 is the result where the metadata encoding button 1004 as shown in FIG. 10 is pressed, and FIG. 15 is the result where the metadata text button 1005 as shown in FIG. 10 is pressed.

In the above manner, when the original image data including the code image in which the source data is encoded is inputted into the image forming apparatus according to this embodiment, the source data can be extracted by decoding the code image, if it is determined that the code image is included in the original image data. Herein, the source data unit the data encompassing the non-metadata and the metadata. Also, the decoding of the code image is called the code image decoding.

The metadata is printed in the metadata area of the original image, and the non-metadata is printed in the non-metadata area of the original image. Herein, in the metadata area, each dot included in the two-dimensional code of meta-data is printed larger, and very resistant to contamination of the original image. On the other hand, in the non-metadata area, each dot included in the two-dimensional code of non-metadata is printed smaller, and less resistant to contamination of the original image.

That is, in the metadata area, the image on the metadata area can be decoded, even if the original image is more or less contaminated, whereas in the non-metadata area, the image on the non-metadata area can not be decoded if the original image is contaminated even slightly.

In this embodiment, the non-metadata is the contents data that the user wants to include within the two-dimensional code. For example, it is music data or Excel data. This non-metadata has a very large amount of data.

On the other hand, the metadata is the data concerning the non-metadata, and important data, but has a smaller amount of data. In this manner, since the metadata has a smaller amount of data and is important data, the metadata is printed more resistant.

In this embodiment, the two-dimensional code is equal to the two-dimensional sign.

Other Embodiments

Further, the present invention may be applied to a system composed of a plurality of apparatuses (e.g., computer, interface unit, reader, printer, etc.) or an apparatus of one component (e.g., image forming apparatus, printer, facsimile apparatus, etc.).

Also, the object of the invention is achieved by a computer (CPU or MPU) in the system or apparatus reading and executing the program codes from a memory medium storing the program codes for implementing a procedure of the flowchart as shown in the foregoing embodiment. In this case, the program codes themselves read from the memory medium realize the functions of the foregoing embodiment. Therefore, the program codes and the memory medium storing the program codes also construct one of the inventions.

As such a memory medium to store the program codes, for example, it is possible to use a floppy (registered trademark) disk, a hard disk, an optical disk, an optomagnetic disk, a CD-ROM, a CD-R, a magnetic tape, a nonvolatile memory card, a ROM or the like.

Also, the functions of the foregoing embodiment may be realized by executing the read program codes on the computer. In addition, it will be also obviously understood that the present invention also incorporates a case where an OS (Operating System) operating on the computer executes a part or all of the actual processes on the basis of the instructions of the program codes, and the functions of the foregoing embodiment are realized by the processes.

Further, the program codes read from the memory medium are written into a memory provided for a function extension board inserted into the computer or a function expansion unit connected to the computer. Thereafter, a CPU or the like provided for the function expansion board or function expansion unit executes a part or all of the actual processes on the basis of instructions of the program codes, and the functions of the foregoing embodiment are realized by the processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-063216, filed Mar. 13, 2007, which is hereby incorporated by reference herein in its entirety.

What is claimed is:

1. An apparatus comprising:
a decoding unit configured to decode a two-dimensional code including an area resistant to contamination and an area less resistant to contamination in an input image; and
a printing unit configured to print the input image in a case that the decoding unit succeeds in decoding the two-dimensional code and not to print the input image in a case that the decoding unit fails in decoding the two-dimensional code,
wherein the decoding unit starts decoding of the area less resistant to contamination after the decoding unit ends decoding of the area resistant to contamination.

2. An apparatus comprising:
a first decoding unit configured to decode an area resistant to contamination of a two-dimensional code in an input image;
a second decoding unit configured to decode an area less resistant to contamination of the two-dimensional code in the input image; and
a printing unit configured to print the input image in a case that the second decoding unit succeeds in decoding the area less resistant to contamination and not to print the input image in a case that the second decoding unit fails in decoding the area less resistant to contamination,
wherein the second decoding unit starts decoding of the area less resistant to contamination after the first decoding unit starts decoding of the area resistant to contamination.

3. The apparatus according to claim 2, wherein the printing unit prints the input image after the input image has been subjected to an image processing.

4. The apparatus according to claim 2, wherein the image processing includes deletion of the two-dimensional code from the input image.

5. The apparatus according to claim 2, wherein the printing unit prints the input image after the input image has been synthesized with a two-dimensional code that is different from the two-dimensional code in the input image.

6. An apparatus comprising:
a first decoding unit configured to decode an area resistant to contamination of a two-dimensional code in an input image;
a second decoding unit configured to decode an area less resistant to contamination of the two-dimensional code in the input image; and
a printing unit configured to print the input image in a case that the second decoding unit succeeds in decoding the area less resistant to contamination and not to print the input image in a case that the second decoding unit fails in decoding the area less resistant to contamination,
wherein the second decoding unit ends decoding of the area less resistant to contamination after the first decoding unit ends decoding of the area resistant to contamination.

7. The apparatus according to claim 6, wherein the printing unit prints the input image after the input image has been subjected to an image processing.

8. The apparatus according to claim 6, wherein the image processing includes deletion of the two-dimensional code from the input image.

9. The apparatus according to claim 6, wherein the printing unit prints the input image after the input image has been synthesized with a two-dimensional code that is different from the two-dimensional code in the input image.

10. An apparatus comprising:
a first decoding unit configured to decode an area resistant to contamination of a two-dimensional code in an input image;
a second decoding unit configured to decode an area less resistant to contamination of the two-dimensional code in the input image; and
a printing unit configured to print the input image in a case that the second decoding unit succeeds in decoding the area less resistant to contamination and not to print the input image in a case that the second decoding unit fails in decoding the area less resistant to contamination,
wherein the second decoding unit decodes the area less resistant to contamination after the first decoding unit decodes the area resistant to contamination.

11. The apparatus according to claim 10, wherein the printing unit prints the input image after the input image has been subjected to an image processing.

12. The apparatus according to claim 10, wherein the image processing includes deletion of the two-dimensional code from the input image.

13. The apparatus according to claim 10, wherein the printing unit prints the input image after the input image has been synthesized with a two-dimensional code that is different from the two-dimensional code in the input image.

14. An apparatus comprising:
a first decoding unit configured to decode an area resistant to contamination of a two-dimensional code in an input image;
a second decoding unit configured to decode an area less resistant to contamination of the two-dimensional code in the input image; and
a printing unit configured to print the input image in a case that the second decoding unit succeeds in decoding the area less resistant to contamination and not to print the input image in a case that the second decoding unit fails in decoding the area less resistant to contamination,
wherein the second decoding unit ends decoding of the area less resistant to contamination after the first decoding unit decodes the area resistant to contamination.

15. The apparatus according to claim 14, wherein the printing unit prints the input image after the input image has been subjected to an image processing.

16. The apparatus according to claim 14, wherein the image processing includes deletion of the two-dimensional code from the input image.

17. The apparatus according to claim 14, wherein the printing unit prints the input image after the input image has been synthesized with a two-dimensional code that is different from the two-dimensional code in the input image.

18. An apparatus comprising:
a first decoding unit configured to decode an area resistant to contamination of a two-dimensional code in an input image;
a second decoding unit configured to decode an area less resistant to contamination of the two-dimensional code in the input image; and
a printing unit configured to print the input image in a case that the second decoding unit succeeds in decoding the area less resistant to contamination and not to print the input image in a case that the second decoding unit fails in decoding the area less resistant to contamination,
wherein the second decoding unit ends decoding of the area less resistant to contamination after the first decoding unit starts decoding of the area resistant to contamination.

19. The apparatus according to claim 18, wherein the printing unit prints the input image after the input image has been subjected to an image processing.

20. The apparatus according to claim 18, wherein the image processing includes deletion of the two-dimensional code from the input image.

21. The apparatus according to claim 18, wherein the printing unit prints the input image after the input image has been synthesized with a two-dimensional code that is different from the two-dimensional code in the input image.

22. An apparatus comprising:
a decoding unit configured to decode a two-dimensional code in an input image; and
a printing unit configured to print the input image in a case that the decoding unit succeeds in decoding the two-dimensional code and not to print the input image in a case that the decoding unit fails in decoding the two-dimensional code,
wherein the two-dimensional code includes an area resistant to contamination and an area less resistant to contamination.

23. The apparatus according to claim 22, wherein the printing unit prints the input image after the input image has been subjected to an image processing.

24. The apparatus according to claim 22, wherein the image processing includes deletion of the two-dimensional code from the input image.

25. The apparatus according to claim 22, wherein the printing unit prints the input image after the input image has been synthesized with a two-dimensional code that is different from the two-dimensional code in the input image.

26. An apparatus comprising:
a first decoding unit configured to decode an area resistant to contamination of a two-dimensional code in an input image;
a second decoding unit configured to decode an area less resistant to contamination of the two-dimensional code in the input image; and
a printing unit configured not to print the input image in a case that the first decoding unit fails in decoding the area resistant to contamination and not to print the input image in a case that the second decoding unit fails in decoding the area less resistant to contamination but to print the input image in a case that the second decoding unit succeeds in decoding the area less resistant to contamination.

27. The apparatus according to claim 26, wherein the printing unit prints the input image after the input image has been subjected to an image processing.

28. The apparatus according to claim 26, wherein the image processing includes deletion of the two-dimensional code from the input image.

29. The apparatus according to claim 26, wherein the printing unit prints the input image after the input image has been synthesized with a two-dimensional code that is different from the two-dimensional code in the input image.

30. An apparatus comprising:
a first extracting unit configured to extract data from an area resistant to contamination of a two-dimensional code in an input image;
a second extracting unit configured to extract data from an area less resistant to contamination of the two-dimensional code in the input image; and
a printing unit configured to print the input image in a case that the second extracting unit succeeds in extracting data from the area less resistant to contamination and not to print the input image in a case that the second extracting unit fails in extracting the area less resistant to contamination, wherein the second extracting unit ends extraction of the data of the area less resistant to contamination from the area less resistant to contamination in the two-dimensional code after the first extracting unit ends extraction of the data of the area resistant to contamination from the area resistant to contamination in the two-dimensional code.

31. The apparatus according to claim 30, wherein the printing unit prints the input image after the input image has been subjected to an image processing.

32. The apparatus according to claim 30, wherein the image processing includes deletion of the two-dimensional code from the input image.

33. The apparatus according to claim 30, wherein the printing unit prints the input image after the input image has been synthesized with a two-dimensional code that is different from the two-dimensional code in the input image.

34. An apparatus comprising:
a first decoding unit configured to decode an area resistant to contamination of a two-dimensional code in an input image;
a second decoding unit configured to decode an area less resistant to contamination of the two-dimensional code in the input image; and
an outputting unit configured to output the input image in a case that the second decoding unit succeeds in decoding the area less resistant to contamination and not to output the input image in a case that the second decoding unit fails in decoding the area less resistant to contamination,
wherein the second decoding unit ends decoding of the area less resistant to contamination after the first decoding unit ends decoding of the area resistant to contamination.

35. An apparatus comprising:
a first decoding unit configured to decode an area resistant to contamination of a two-dimensional code in an input image;
a second decoding unit configured to decode an area less resistant to contamination of the two-dimensional code in the input image; and
an outputting unit configured to output the input image in a case that the second decoding unit succeeds in decoding the area less resistant to contamination and not to output the input image in a case that the second decoding unit fails in decoding the area less resistant to contamination,
wherein the second decoding unit ends decoding of the area less resistant to contamination after the first decoding unit starts decoding of the area resistant to contamination.

36. An apparatus comprising:
a decoding unit configured to decode a two-dimensional code in an input image; and
an outputting unit configured to output the input image in a case that the decoding unit succeeds in decoding the two-dimensional code and not to output the input image in a case that the decoding unit fails in decoding the two-dimensional code,
wherein the two-dimensional code includes an area resistant to contamination and an area less resistant to contamination.

37. An apparatus comprising:
a first decoding unit configured to decode an area resistant to contamination of a two-dimensional code in an input image;
a second decoding unit configured to decode an area less resistant to contamination of the two-dimensional code in the input image; and
an outputting unit configured not to output the input image in a case that the first decoding unit fails in decoding the area resistant to contamination and not to output the input image in a case that the second decoding unit fails in decoding the area less resistant to contamination but to output the input image in a case that the second decoding unit succeeds in decoding the area less resistant to contamination.

38. A method comprising:
a first decoding step of decoding an area resistant to contamination of a two-dimensional code in an input image;
a second decoding step of decoding an area less resistant to contamination of the two-dimensional code in the input image; and
a printing step of printing the input image in a case that decoding of the area less resistant to contamination succeeds in the second decoding step and not printing the input image in a case that decoding of the area less resistant to contamination fails in the second decoding step,
wherein decoding of the area less resistant to contamination ends in the second decoding step after decoding of the area resistant to contamination ends in the first decoding step.

39. A method comprising:
a first decoding step of decoding an area resistant to contamination of a two-dimensional code in an input image;
a second decoding step of decoding an area less resistant to contamination of the two-dimensional code in the input image; and
a printing step of printing the input image in a case that decoding of the area less resistant to contamination succeeds in the second decoding step and not printing the input image in a case that decoding of the area less resistant to contamination fails in the second decoding step,
wherein decoding of the area less resistant to contamination ends in the second decoding step after decoding of the area resistant to contamination starts in the first decoding step.

40. A method comprising:
a decoding step of decoding a two-dimensional code in an input image; and
a printing step of printing the input image in a case that decoding of the two-dimensional code succeeds in the decoding step and not printing the input image in a case that decoding of the two-dimensional code fails in the decoding step,
wherein the two-dimensional code includes an area resistant to contamination and an area less resistant to contamination.

41. A method comprising:
a first decoding step of decoding an area resistant to contamination of a two-dimensional code in an input image;
a second decoding step of decoding an area less resistant to contamination of the two-dimensional code in the input image; and
a printing step of printing the input image in a case that decoding of the area resistant to contamination fails in the first decoding step and not printing the input image in a case that decoding of the area less resistant to contamination fails in the second decoding step, but printing the input image in a case that decoding of the area less resistant to contamination succeeds in the second decoding step.

42. A non-transitory computer readable storage medium storing a program executable by a computer to perform a method comprising:
   a decoding step of decoding a two-dimensional code in an input image; and
   a printing step of printing the input image in a case that decoding of the two-dimensional code succeeds in the decoding step and not printing the input image in a case that decoding of the two-dimensional code fails in the decoding step,
   wherein the two-dimensional code includes an area resistant to contamination and an area less resistant to contamination.

\* \* \* \* \*